United States Patent [19]
Bergeron

[11] Patent Number: 5,152,071
[45] Date of Patent: Oct. 6, 1992

[54] PROPELLER PITCH GAUGE

[75] Inventor: Robert M. Bergeron, Derry, N.H.

[73] Assignee: Land & Sea, Inc., North Salem, N.H.

[21] Appl. No.: 850,495

[22] Filed: Mar. 13, 1992

[51] Int. Cl.[5] ............................ G01B 7/30; G01B 5/34
[52] U.S. Cl. ........................................................ 33/530
[58] Field of Search .......................................... 33/530

[56] References Cited

U.S. PATENT DOCUMENTS

| | | |
|---|---|---|
| 284,427 | 9/1883 | Hutton . |
| 1,245,340 | 11/1917 | Heath . |
| 2,358,987 | 9/1944 | MacKay . |
| 2,749,623 | 6/1956 | LaBarre, Jr. et al. . |
| 3,380,170 | 4/1968 | Read . |
| 4,056,888 | 11/1977 | Hughey .................. 33/530 |
| 4,642,901 | 2/1987 | Webb ..................... 33/530 |

FOREIGN PATENT DOCUMENTS 94340 7/1959 Norway ........................... 33/530

*Primary Examiner*—Harry N. Haroian
*Attorney, Agent, or Firm*—Davis, Bujold & Streck

[57] ABSTRACT

A pitch gauge for measuring the pitch of a propeller blade which comprises an engaging portion for insertion into a propeller hub, a scale provided on the engaging portion to measure the depth that the engaging portion is inserted into the propeller hub, and a contacting portion for contacting a blade on the propeller hub which prevents further insertion of the engaging portion when the contacting portion contacts the blade. By inserting the pitch gauge into the propeller hub at two different positions a predetermined rotational angle apart, two axial reference points can be obtained. From the axial reference points and the predetermined rotational distance, the pitch of a propeller blade can be computed.

13 Claims, 4 Drawing Sheets

PROPELLER PITCH GAUGE

BACKGROUND OF THE INVENTION

This invention relates to a gauge for measuring the pitch of a propeller blade.

Bladed propellers are used in many machines and devices for a myriad of purposes. Examples are the use of a propeller in a fan to blow air or the use of a sturdily constructed propeller to push a boat through water. A typical propeller consists of a plurality of blades mounted on a central hub. The central hub often defines an axial bore by which the hub can be connected to a shaft. Such an axial bore may be substantially circular and have a keyway, for use with a key, or a plurality of splines to engage the shaft.

The blades of such a propeller extend generally radially from the central hub and have a pitch. The pitch is the theoretical distance a propeller would advance longitudinally in one revolution. A means for measuring the pitch of a blade is important as blade pitch is a substantial factor in determining the performance of a propeller. This is particularly important where the blades are adjustable as to pitch.

Several devices exist in the art for measuring the pitch of a propeller blade. The typical device in the prior art consists of a means attachable to the propeller hub with a series of arms and pins to engage the surface of the blade. The pins which engage the blade are connected to slidable or rotatable scales to measure an axial distance and a rotational angle over the axial distance. Alternative devices have protractors mounted upon one of the arms which measure the angle that the pin engages the blade. Other alternative devices use a plurality of pins which are positioned on the blade to, via an arm, give a representation of the blade. Such devices, using movable arms and pins to engage rotational and axial scales are exemplified in Hughey, Jr., U.S. Pat. No. 4,056,888, issued Nov. 8, 1977.

The devices known in the art for measuring the pitch of a propeller blade are generally complicated, difficult to manufacture, expensive and require a great deal of expertise to operate.

It is the object of the present invention to provide a device for measuring the pitch of a propeller blade which has no moving parts.

Another object of the invention is provide a device for measuring the pitch of a propeller blade which is inexpensive and easy to manufacture.

It is another object of the present invention to provide a device for measuring the pitch of a propeller blade which is easy to use and does not require a great deal of expertise on the part of the operator.

A further object of the present invention is to provide a device which can measure the pitch of a propeller blade in a specific sector of the blade.

SUMMARY OF THE INVENTION

The present invention provides a pitch gauge for measuring the pitch of a blade on a propeller hub having an axial bore. The pitch gauge comprises an elongate engaging portion having a free end, for insertion into the axial bore of the propeller hub and a second end; means provided on the engaging portion to provide an indication of the depth to which the engaging portion is inserted into the axial bore of the propeller hub, and a contacting portion for contacting said blade, said contacting portion extending from the second end of the engaging portion and having a distal end fixedly positioned relative to the engaging portion to facilitate said contact, said contacting portion preventing further insertion of the engaging portion when the distal end contacts the blade.

BRIEF DESCRIPTION OF THE DRAWINGS

The invention will now be described, by way of example, with reference to the accompanying drawings, in which.

DETAILED DESCRIPTION OF THE DRAWINGS

Figure 1:
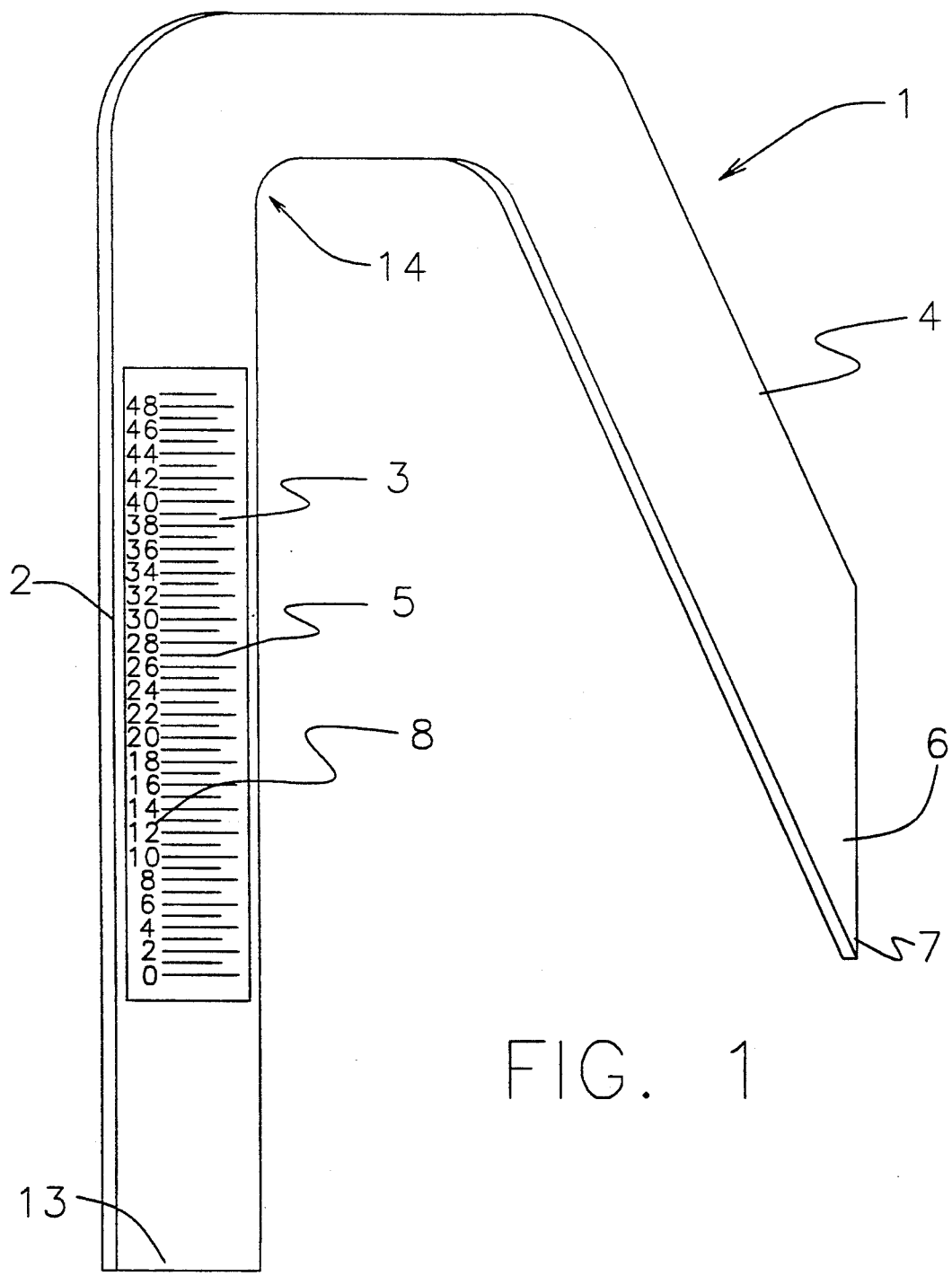
FIG. 1 is an elevation view taken at a small angle to the face of a pitch gauge according to the present invention.
Figure 2:
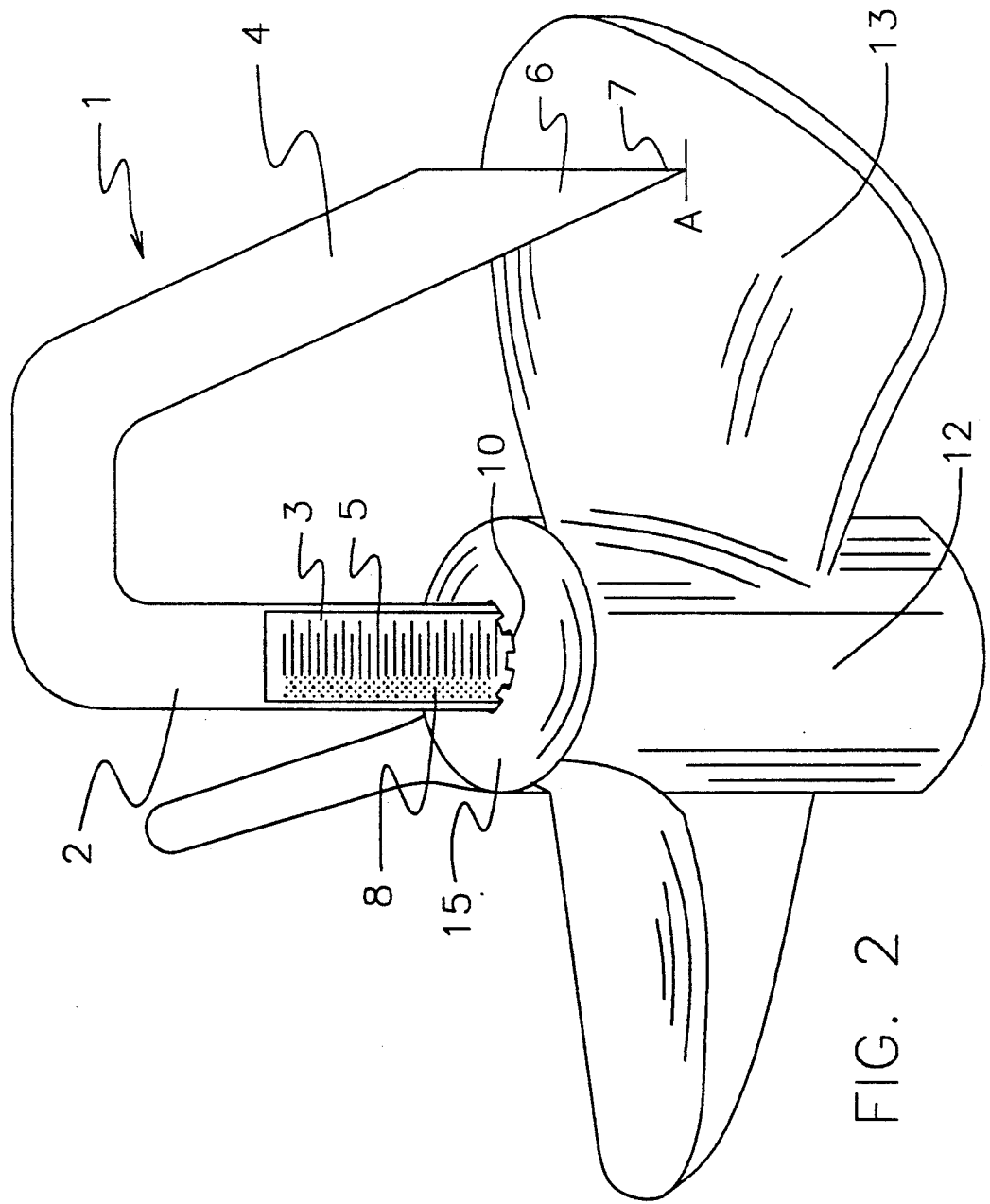
FIG. 2 is a perspective view of the pitch gauge in use with a propeller having a splined bore and indicating a reference position A.

Referring first to FIG. 1, the propeller pitch gauge 1 is comprised of an engaging portion 2 having a scale 3, and a contacting portion 4. The engaging portion 2 has a free end 13 of rectangular cross-section. The end is sized to simultaneously engage generally diametrically opposite spline defined grooves 10 of a hub 12 as shown in FIG. 2. The engaging portion 2 is elongate and has the free end 13 and a second, opposite, end 14. The scale 3 is provided on the engaging portion 2 to measure the depth that this portion is inserted into the grooves 10. The scale 3 has a plurality of parallel divisions 5, each parallel division 5 having a corresponding numerical value 8. As shown in FIG. 1, the value for the parallel divisions 5 are from 0 to 48.

The fit of the engaging portion in the grooves determines the accuracy of the pitch measurement, the tighter the fit, the more accurate the measurement.

The contacting portion 4 is coplanar with and extends from the second end 14 of the engaging portion 2. The contacting portion 4 is shaped so that its distal end 6 is fixedly positioned relative to the engaging portion 2 to facilitate contact with the blade. The contacting portion 4 terminates in a point 7, at the distal end 6, provided to contact with the surface of a blade 13 as shown in FIG. 2 when the engaging portion 2 is inserted in grooves 10. When in contact with the blade 13, the point 7 prevents axial motion of the contacting portion 4 and, consequently, the connected engaging portion 2. When this occurs, one of the parallel divisions 5 of the scale 3 will be substantially flush with the end face 15 from which extends the axial bore defining the grooves 10. From the appropriate parallel division 5, a corresponding numeral 8 defining the extent of insertion can be obtained.

Figure 3:
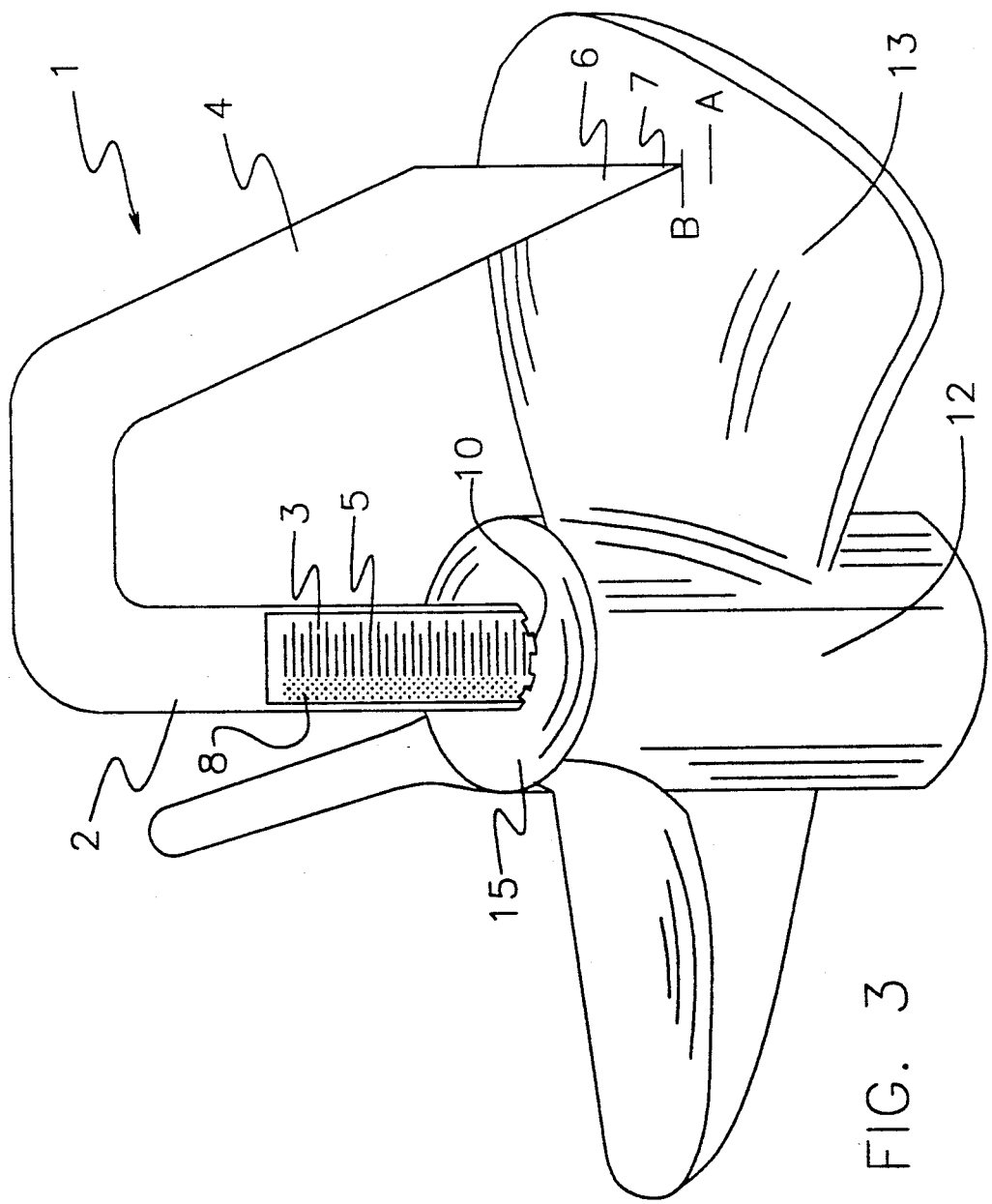
FIG. 3 is a perspective view of the pitch gauge in use with a propeller and indicating a reference position B.

The operation of the propeller pitch gauge will now be described with reference to FIGS. 2 and 3. The engaging portion 2 is inserted into the grooves 10 until the contacting portion 4 contacts the blade 13 with point 7. The position on the blade 13 which is in contact with the point 7 is designated reference point A. The operator then looks at the scale 3 to determine which parallel division 5 is substantially flush with the end face 15. From this parallel division 5, the operator can obtain a reference numeral 8. This reference numeral 8 designates a value for the reference point A.

The pitch gauge is then withdrawn from the grooves 10 and reinserted into the hub a desired number of grooves 10 away from the previous position. An example would be to rotate the pitch gauge one spline groove 10 anticlockwise as shown in FIG. 3. The pitch gauge is then inserted as above until the contacting portion 4, at point 7, comes into contact with the blade 13. The position on the blade 13 in contact with point 7 is designated reference position B. In the same manner as before, the operator determines which parallel division 5 is substantially flush with the end face 15. The appropriate parallel division 5 will give a numerical value 8 to correspond to reference position B. The difference between the numerical values 8 for reference position A and B will yield the axial distance therebetween. The rotational angle between reference position A and reference position B will have been predetermined by the rotational angle between the grooves 10 and the number of grooves 10 that the pitch gauge 1 is moved. From the axial distance and the rotational angle, the pitch can be computed using the formula:

$$\text{PITCH} = \frac{\text{AXIAL DISTANCE} \times 360°}{\text{ROTATIONAL ANGLE (°)}}$$

In practice, it is useful to have a chart or table which accompanies the pitch gauge for quick and easy determination of the pitch from the numerical values for reference positions A and B. When using a chart or table, the chart or table will usually be calibrated for a specific total number of grooves 10 and for a specific number of grooves 10 to move the pitch gauge 1 to measure reference positions A and B. When the angular spacing is known, the scale 3 can be calibrated so that the pitch can be directly ascertained from the difference between the numerical values for reference positions A and B. As an example, if reference position A has a numerical value of 42 and reference position B has a numerical value of 24, the pitch is 18.

The pitch gauge 1 is preferably constructed of sheet metal of a thickness to provide the desired engagement of grooves 10, however, other material of similar thickness may be used, such as plastic. The pitch gauge 1 is constructed so as to be torsionally rigid in order to keep the engaging portion 2 and the contacting portion 4 in the same relative positions. Similarly, the contacting portion 4 is sufficiently rigid in the axial direction to prevent unnecessary deformation upon contact with the blade 13. The engaging portion 2 has an axial length long enough to be inserted into the hub 12 so that the contacting portion 4 contacts the blade 13. The engaging portion 2 also has a width substantially equal to a diameter between the bases of two opposed grooves 12 in the hub 12 of the propeller to be measured. Similarly, the engaging portion 2 has a thickness substantially equal to the width of the grooves 10 in the hub 12 to be measured. The thickness of said engaging portion 2 can be determined so that the engaging portion 2 can engage a propeller hub with an odd number of grooves and therefor having no diametrically opposed grooves The pitch gauge 1 as described above can be made by stamping or any other process well known in the art.

Figure 4:
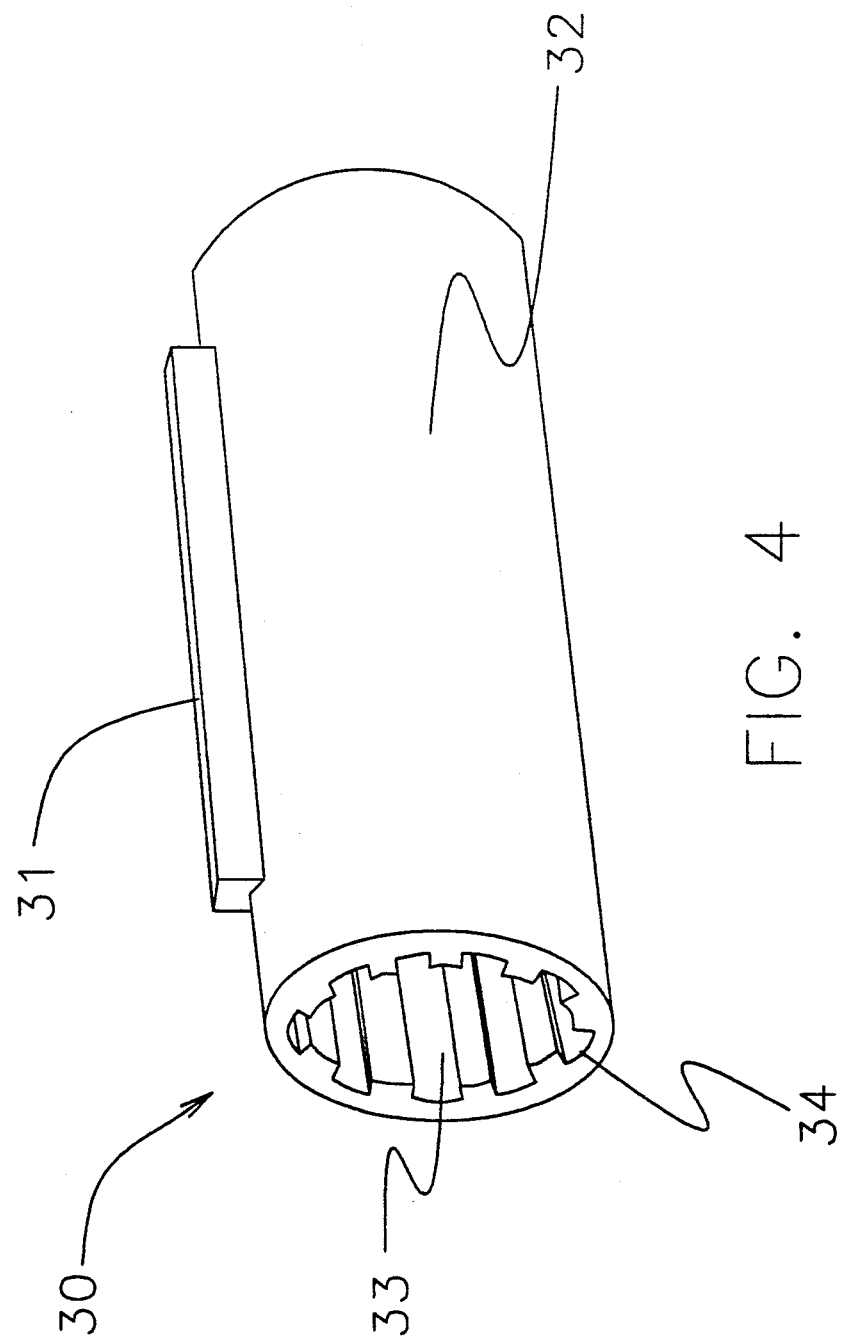
FIG. 4 is a perspective view of an adapter device of a second embodiment of the present invention for use when the pitch gauge is used with a propeller having a bore with a keyway in place of the splines of FIGS. 2 and 3.

FIG. 4 shows a pitch gauge adapter 30 for insertion in an axial bore of a hub which has a keyway instead of spline defined grooves. The cylindrical portion 32 is designed to fit in the axial bore of the hub. A key like projection 31 is provided on the cylindrical portion 32 for engaging the keyway of the axial bore. The cylindrical portion has a central opening 33 provided with grooves 34 for engaging the engaging portion 2 of the pitch gauge 1. Once the pitch gauge adapter 30 is inserted into the hub, numerical values for reference positions A and B can be obtained using the pitch gauge 1 in the manner previously described. Of course, a radially projecting pin of an appropriate diameter and length may be substituted for the key.

It is to be appreciated that the pitch gauge 1 can be used in conjunction with various types of pitch gauge adapters for propeller hubs which have other types of axial bores for engaging a shaft provided that the axial bore has some means for defining an angular position of rotation relative to the blades. It should also be noted that the central opening of the pitch gauge adapter 30 can have many variations with which to engage the pitch gauge 1. An example would be to have a pair of slots or grooves spaced a predetermined rotational distance apart instead of a plurality of spline defined grooves.

It is also to be appreciated that the pitch gauge 1 can be used to measure the pitch of any desired specific sector of a blade 13 by using an appropriate rotational angle between reference position A and reference position B.

The pitch gauge herein described has no moving parts in its structure, is easy and inexpensive to manufacture, is easy to use, does not require a great deal of expertise in use by the operator and can be used to measure the pitch of either small sectors of a propeller blade or to take average measurements of a large sector of a propeller blade.

I claim:

1. A pitch gauge for measuring the pitch of a blade on a propeller hub having an axial bore, said pitch gauge comprising:
   an elongate engaging portion having a free end, for insertion into the axial bore of the propeller hub and a second end;
   means provided portion to provide an indication of the depth to which the engaging portion is inserted into the axial bore of the propeller hub; and
   a contacting portion for contacting said blade, said contacting portion extending from the second end of the engaging portion and having a distal end fixedly positioned relative to the engaging portion to facilitate said contact, said contacting portion preventing further insertion of the engaging portion when the distal end contacts the blade.

2. A pitch gauge as in claim 1, wherein the engaging portion is rectangular in cross-section and sized to engage spline defined grooves of said bore to determine the angular position of the gauge relative to said blade, and the indication means is a scale on the engaging portion.

3. A pitch gauge as in claim 2, wherein the engaging portion has a thickness substantially equal to a width of each of the grooves.

4. A pitch gauge as in claim 2, wherein the engaging portion has a width substantially equal to a diameter defined by the bases of diametrically opposed grooves.

5. A pitch gauge as in claim 2, wherein the scale has a plurality of parallel divisions, each parallel division having a corresponding numerical value.

6. A pitch gauge as in claim 1, wherein the contacting portion is in the same plane as the engaging portion.

7. A pitch gauge as in claim 1, wherein the distal end of its contacting portion is a point for engaging the propeller blade.

8. A pitch gauge as in claim 1, further comprising a pitch gauge adapter for removable connection to the engaging portion and for insertion into the axial bore of a propeller hub having means for ascertaining an angular position relative to said blade, the pitch gauge adapter comprising:
  a portion to fit into the axial bore,
  means for engaging the angular position ascertaining means, and
  a central opening shaped to engage the engaging portion of the pitch gauge with at least one groove.

9. A pitch gauge as in claim 8, wherein the means for engaging is a keyed portion.

10. A pitch gauge as in claim 8, wherein the central opening defines a plurality of grooves.

11. A pitch gauge as in claim 8, wherein the central opening defines at least one pair of grooves spaced a predetermined rotational angle apart.

12. A method of measuring the pitch of a blade mounted on a propeller hub having an axial bore, said method comprising the steps of:
  inserting an engaging portion of a pitch gauge a first angular position in the axial bore of the propeller hub, the engaging portion having a free end for insertion into the axial bore of the propeller hub and a second end;
  stopping the insertion when a distal end of a contacting portion, which extends from the second end of the engaging portion, comes into contact with the blade;
  determining a value on a scale provided on the engaging portion which corresponds to a depth that the engaging portion is inserted into the first position in the axial bore of the propeller hub;
  removing the engaging portion of the pitch gauge from the axial bore;
  reinserting the engaging portion into a second angular position of the axial bore of the propeller hub until the distal end of the contacting portion comes into contact with the blade, said second position being a predetermined rotational angle from the first position;
  determining a value on the scale which corresponds to a depth that the engaging portion is inserted into the second position in the axial bore of the propeller hub, and
  determining the blade pitch from said scale values and said rotational angle between the first and second positions.

13. A method as in claim 12, comprising the further step of:
  inserting a pitch gauge adapter, having a portion to fit the axial bore, into the axial bore of the propeller hub, said pitch gauge adapter having a means for engaging an angular position ascertaining means of the axial bore; and
  inserting the engaging portion into a central opening of the pitch gauge adapter, said central opening is shaped to engage the engaging portion of the pitch gauge with at least one groove.

* * * * *

UNITED STATES PATENT AND TRADEMARK OFFICE
CERTIFICATE OF CORRECTION

PATENT NO. : 5,152,071

DATED : October 6, 1992

INVENTOR(S) : Robert M. BERGERON

It is certified that error appears in the above-identified patent and that said Letters Patent is hereby corrected as shown below:

Column 4, line 44 after "provided" insert --on the engaging--.

Signed and Sealed this

Fifth Day of October, 1993

Attest:

BRUCE LEHMAN

Attesting Officer

Commissioner of Patents and Trademarks